United States Patent

Zheng et al.

(10) Patent No.: US 10,136,435 B1
(45) Date of Patent: Nov. 20, 2018

(54) ORTHOGONAL FREQUENCY DIVISION MULTIPLEX DATA UNIT DECODING

(71) Applicant: Marvell International Ltd., Hamilton (BM)

(72) Inventors: Xiayu Zheng, San Jose, CA (US); Bo Yu, Fremont, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 126 days.

(21) Appl. No.: 15/236,188

(22) Filed: Aug. 12, 2016

Related U.S. Application Data

(60) Provisional application No. 62/204,790, filed on Aug. 13, 2015.

(51) Int. Cl.
*H04W 72/04* (2009.01)
*H04W 84/12* (2009.01)
*H04L 5/00* (2006.01)
*H04W 84/20* (2009.01)

(52) U.S. Cl.
CPC ....... *H04W 72/0453* (2013.01); *H04L 5/0007* (2013.01); *H04W 84/12* (2013.01); *H04W 84/20* (2013.01)

(58) Field of Classification Search
CPC .......................... H04W 72/0453; H04L 5/0007
See application file for complete search history.

(56) References Cited

U.S. PATENT DOCUMENTS

| | | | |
|---|---|---|---|
| 7,599,332 B2 | 10/2009 | Zelst et al. | |
| 7,742,390 B2 | 6/2010 | Mujtaba | |
| 8,218,681 B2 * | 7/2012 | Seki | H04J 11/0076 375/135 |
| 8,339,978 B2 | 12/2012 | Sawai et al. | |
| 8,526,351 B2 | 9/2013 | Fischer et al. | |
| 8,599,803 B1 * | 12/2013 | Zhang | H04L 1/0643 370/338 |
| 8,599,804 B2 | 12/2013 | Erceg et al. | |
| 8,619,907 B2 | 12/2013 | Mujtaba et al. | |

(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Rasheed Gidado

(57) ABSTRACT

A method for decoding an orthogonal frequency division multiplex (OFDM) data unit transmitted via an OFDM communication channel is described. A first OFDM symbol of the OFDM data unit is received at a communication device via a first sub-channel of the OFDM communication channel. A candidate OFDM symbol is detected by the communication device on a second sub-channel of the OFDM communication channel. A bandwidth of the OFDM communication channel is detected by the communication device based on the detected candidate OFDM symbol. At least one OFDM symbol of the OFDM data unit is decoded by the communication device based on the detected bandwidth.

19 Claims, 7 Drawing Sheets

(56) References Cited

U.S. PATENT DOCUMENTS

| | | | |
|---|---|---|---|
| 8,724,720 | B2 | 5/2014 | Srinivasa et al. |
| 9,065,715 | B2 * | 6/2015 | Jungnickel .......... H04L 27/2647 |
| 9,084,188 | B2 * | 7/2015 | Yen ....................... H04W 56/00 |
| 2009/0175372 | A1 * | 7/2009 | Moon ................. H04L 27/2602 375/260 |
| 2009/0196163 | A1 | 8/2009 | Du |
| 2010/0046656 | A1 | 2/2010 | van Nee et al. |
| 2010/0260159 | A1 | 10/2010 | Zhang et al. |
| 2013/0242974 | A1 * | 9/2013 | Li ......................... H04W 56/00 370/350 |
| 2014/0023156 | A1 * | 1/2014 | Zhang .................. H04L 5/0048 375/260 |
| 2015/0016377 | A1 * | 1/2015 | Kim ..................... H04B 7/2615 370/329 |
| 2015/0036631 | A1 * | 2/2015 | Yang ................. H04W 72/0446 370/329 |
| 2017/0207944 | A1 * | 7/2017 | Zhang ................ H04L 27/2608 |

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

Chen, "Home Network Basis: Transmission Environments and Wired/Wireless Protocols," Prentice Hall, pp. 1-26 (Jul. 2006).

Hiertz et al., "The IEEE 802.11 Universe," IEEE Communications Magazine, pp. 62-70, (Jan. 2010).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Shi et al., "Phase Tracking During VHT-LTF," *The Institute of Electrical and Electronics Engineers, Inc.*, pp. 1-19 (Jul. 2010).

Stacey et al., "IEEE P802.11, Wireless LANs, Proposed TGac Draft Amendment," Institute of Electrical and Electronics Engineers, pp. 1-154 (Jan. 2011).

Stacey et al., "Specification Framework for TGac," *Institute for Electrical and Electronics Engineers*, pp. 1-49, (Jan. 18, 2011).

Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-11 (2009).

Van Zelst et al., "Pilot Sequence for VHT-Data," *The Institute of Electrical and Electronics Engineers, Inc.*, pp. 1-10 (Jul. 2010).

\* cited by examiner

ORTHOGONAL FREQUENCY DIVISION MULTIPLEX DATA UNIT DECODING

CROSS-REFERENCES TO RELATED APPLICATIONS

This disclosure claims the benefit of U.S. Provisional Patent Application No. 62/204,790, entitled "Early BW Detection at LSIG for WLAN System" and filed on Aug. 13, 2015, the disclosure of which is incorporated herein by reference in its entirety.

FIELD OF THE DISCLOSURE

The present disclosure relates generally to communication networks and, more particularly, to decoding orthogonal frequency division multiplex data units.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technologies is described in detail in the IEEE 802.11 Standards, including for example, the IEEE Standards 802.11a/b/g, 802.11n, and 802.11ac and their updates and amendments, as well as the IEEE Standard 802.11ax now in the process of being adopted, all of which are collectively incorporated herein fully by reference. These standards and draft standards specify various methods of establishing connections between wireless devices. For example, in an infrastructure mode, wireless devices must first connect with a wireless access point and all communications occur via the access point. On the other hand, in an ad hoc mode, wireless devices can connect and communicate with each other directly, as opposed to communicating via an access point.

SUMMARY

In an embodiment, a method for decoding an orthogonal frequency division multiplex (OFDM) data unit transmitted via an OFDM communication channel includes receiving, at a communication device, a first OFDM symbol of the OFDM data unit via a first sub-channel of the OFDM communication channel. The method also includes detecting, by the communication device, a candidate OFDM symbol on a second sub-channel of the OFDM communication channel. The method includes detecting, by the communication device, a bandwidth of the OFDM communication channel based on the detected candidate OFDM symbol. The method also includes decoding, by the communication device, at least one OFDM symbol of the OFDM data unit based on the detected bandwidth.

In another embodiment, a communication device for decoding an OFDM data unit transmitted via an OFDM communication channel includes a network interface device having one or more integrated circuits. The one or more integrated circuits are configured to receive a first OFDM symbol of the OFDM data unit via a first sub-channel of the OFDM communication channel. The one or more integrated circuits are also configured to detect a candidate OFDM symbol on a second sub-channel of the OFDM communication channel. The one or more integrated circuits are configured to detect a bandwidth of the OFDM communication channel based on the detected candidate OFDM symbol. The one or more integrated circuits are configured to decode at least one OFDM symbol of the OFDM data unit based on the detected bandwidth.

DETAILED DESCRIPTION

Figure 1:
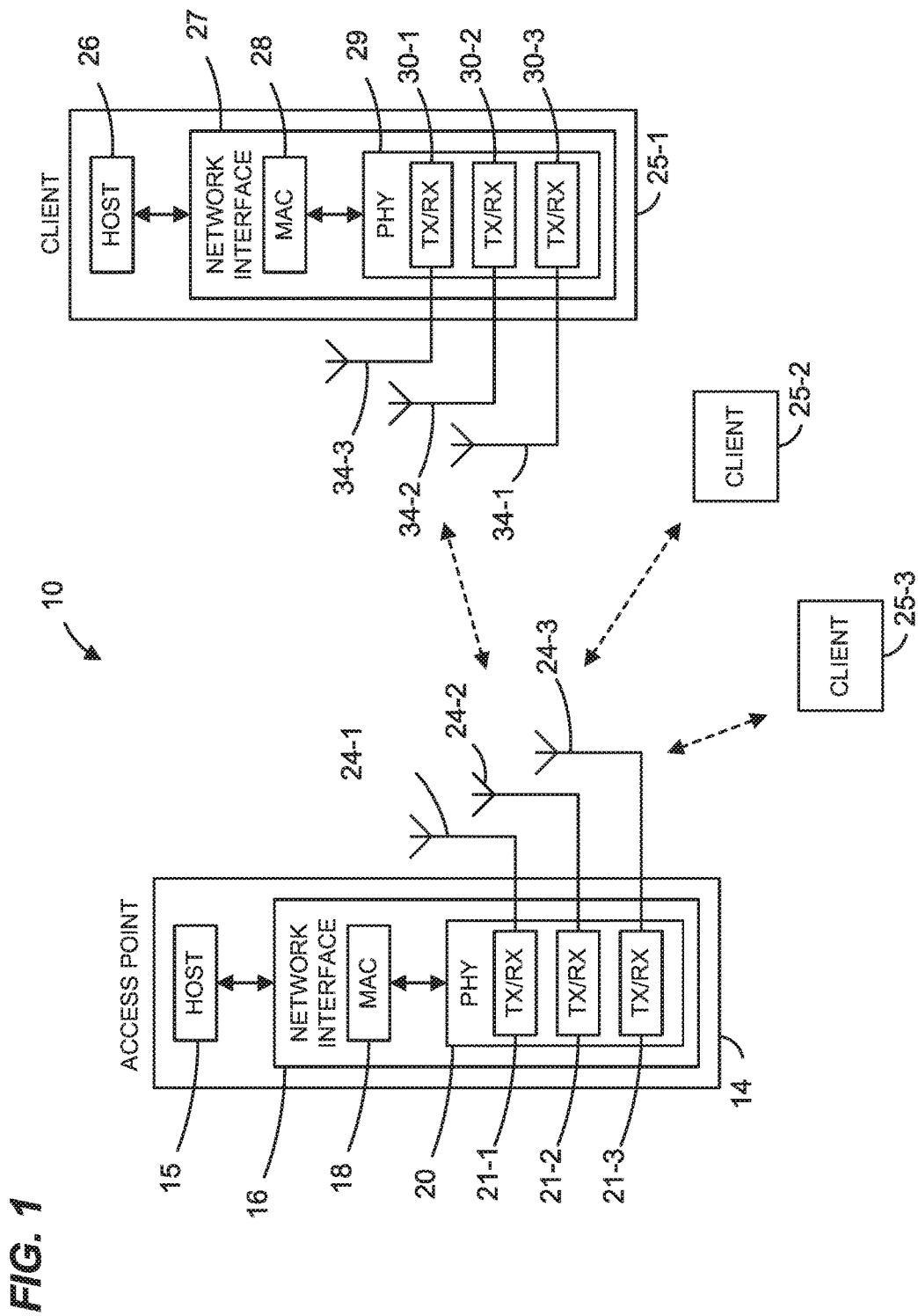
FIG. 1 is a block diagram of an example wireless local area network (WLAN), according to an embodiment.

In embodiments described below, a wireless network device such as an access point (AP) or client station (STA) of a wireless local area network (WLAN) receives an orthogonal frequency division multiplex (OFDM) data unit. In some embodiments and/or scenarios, the WLAN is configured to utilize a communication channel that is wider than a smallest bandwidth band according to a wireless communication protocol. In an embodiment, for example, an AP and a client station of a WLAN operate according to the Institute for Electrical and Electronics Engineers (IEEE) 802.11n Standard, which has a smallest bandwidth band of 20 MHz, and utilize a 40 MHz wide communication channel that has a primary 20 MHz sub-channel and a secondary 20 MHz sub-channel. In some scenarios, the AP or client station receives an OFDM data unit that is duplicated across multiple sub-channels of the communication channel, for example, across the primary sub-channel and the secondary sub-channels (i.e., secondary 20 MHz, secondary 40 MHz, etc.).

In a conventional receiver, the OFDM data unit is decoded utilizing only the primary sub-channel, even when the data unit has been duplicated across the secondary sub-channel (e.g., across a bandwidth wider than 20 MHz). Decoding OFDM data units utilizing only the primary sub-channel is a bottleneck of receiver sensitivity, in some scenarios. In one such scenario, when the AP and client station have unbalanced transmission power (e.g., where the AP has a higher transmission power), the AP is able to transmit a downlink OFDM data unit at a relatively high data rate, while the client station transmits an uplink response (e.g., a block acknowledgment) at a relatively low data rate. For example, the AP utilizes a communication channel having an 80 MHz band for the downlink OFDM data unit (e.g., at 195 Mbps or more) while the client station utilizes a legacy data rate (e.g., a Basic rate of 6 Mbps, 12 Mbps, 24 Mbps, etc.) for a 20 MHz band that is duplicated across the same 80 MHz bandwidth. When decoding only the primary 20 MHz sub-channel of the block acknowledgment, the AP experiences reduced receiver sensitivity, for example, $10*\log_{10}(80/20)=$ 6 dB under additive white noise channel. In various embodiments described below, the receiver detects the bandwidth utilized earlier than a conventional receiver and combines OFDM symbols across multiple sub-channels to improve decoding accuracy.

In an embodiment, a communication device such as an AP or client station receives a first OFDM symbol of the OFDM data unit via a first sub-channel of the OFDM communication channel. In an embodiment, the communication device detects a candidate OFDM symbol on a second sub-channel of the OFDM communication channel. The communication device detects a bandwidth of the OFDM communication channel based on the detected candidate OFDM symbol. The communication device decodes at least one OFDM symbol of the OFDM data unit based on the detected bandwidth. For example, the communication device combines at least one OFDM symbol of the OFDM data unit with a respective OFDM symbol simultaneously received via the second sub-channel and decodes the combined OFDM symbol.

FIG. 1 is a block diagram of an example wireless local area network (MAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., according to the Institute for Electrical and Electronics Engineers (IEEE) 802.11a Standard, the IEEE 802.11g Standard, the IEEE 802.11n Standard, or IEEE 802.11ac Standard). In some embodiments, the MAC processor 18 and the PHY processor 20 are also configured to operate according to a second communication protocol (e.g., an additional 802.11 standard). In yet another embodiment, the MAC processor 18 and the PHY processor 20 are additionally configured to operate according to the second communication protocol, a third communication protocol, and/or additional communication protocols (e.g., according to the IEEE 802.11ax Standard and/or additional 802.11 standards).

The WLAN 10 includes a plurality of client stations 25. Although three client stations 25 are illustrated in FIG. 1, the WLAN 10 includes other suitable numbers (e.g., 1, 2, 4, 5, 6, etc.) of client stations 25 in various scenarios and embodiments. At least one of the client stations 25 (e.g., client station 25-1) is configured to operate at least according to the first communication protocol. In some embodiments, at least one of the client stations 25 or another communication device (not shown) is not configured to operate according to the IEEE 802.11n, 802.11ac, or 802.11ax Standards but is configured to operate according to at least one of the IEEE 802.11a or 802.11g Standards (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PRY processor 29 is implemented on at least a second IC. In an embodiment, at least a portion of the MAC processor 28 and at least a portion of the PHY processor 29 are implemented on a single IC.

According to an embodiment, the client station 25-3 is a legacy client station, i.e., the client station 25-3 is not enabled to receive and fully decode a data unit that is transmitted by the AP 14 or another client station 25 according to the IEEE 802.11ax Standard. Similarly, according to an embodiment, the legacy client station 25-3 is not enabled to transmit data units according to the IEEE 802.11ax Standard. On the other hand, the legacy client station 25-3 is enabled to receive and fully decode and transmit data units according to the IEEE 802.11a, 802.11g, 802.11n, and/or 802.11ac Standards.

In an embodiment, one or both of the client stations 25-2 and 25-3, has a structure that is the same as or similar to the client station 25-1. In an embodiment, the client station 25-3 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client station 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antennas) 34. Similarly, the transceiver(s) 30 is/are configured to receive data units via the antenna(s) 34. The MAC processor 28 and the PHY processor 29 of the client station 25-1 are configured to process received data units conforming to the first communication protocol and having formats described hereinafter and to determine that such data units conform to the first communication protocol, according to various embodiments.

In various embodiments, one or both of the AP 14 and the client station 25 are configured to transmit and/or receive OFDM data units that are duplicated over multiple OFDM sub-channels of a wireless communication channel. In other words, the AP 14 or client station 25 transmits a first OFDM data unit via a first sub-channel (e.g., a primary sub-channel) and simultaneously transmits a duplicate of the first OFDM data unit via one or more second sub-channels (i.e., a secondary sub-channel) and thus the first OFDM data unit is duplicated in each smallest bandwidth band (e.g., each 20 MHz band) of the WLAN 10. In an embodiment, the first sub-channel is a 20 MHz primary sub-channel and the second sub-channel is an adjacent 20 MHz secondary sub-channel, thus two instances of the first OFDM data unit are transmitted via a 40 MHz communication channel. In another embodiment, the first sub-channel is a 40 MHz primary sub-channel and the second sub-channel is a 40 MHz secondary sub-channel that is adjacent to the primary sub-channel, thus four instances of the first OFDM data unit are transmitted via an 80 MHz communication channel. In other embodiments, the communication channel is 160 MHz, 320 MHz, or another suitable bandwidth.

Figure 2:
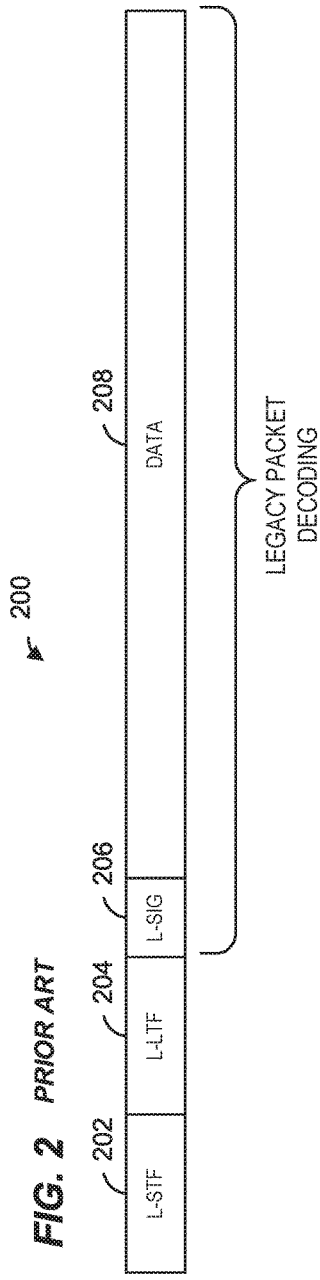
FIG. 2 is a diagram of a prior art data unit format.

FIG. 2 is a diagram of a prior art OFDM data unit 200 that the AP 14 is configured to transmit to the client station 25 via OFDM modulation, according to an embodiment. In an embodiment, the client station 25 is also configured to transmit the data unit 200 to the AP 14. The data unit 200 conforms to the IEEE 802.11a or 802.11g Standard and occupies a 20 Megahertz (MHz) bandwidth. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters with the data unit 200, such as modulation type and coding rate used to transmit the data unit, for example. The data unit 200 also includes a data portion 208. The data unit 200 is designed for transmission over one spatial or space-time stream in a single input single output (SISO) channel configuration.

A transmitter (e.g., the AP 14 or client station 25) of the data unit 200 encodes at least a portion of the data unit 200 utilizing a first encoding scheme or "legacy encoding," for example, binary convolutional coder (BCC) with a 1/2 rate and binary phase shift keying (BPSK), in an embodiment. The legacy encoded portion includes the L-SIG field 206, and the data portion 208 which use different or same modulation and coding schemes (MCS), in various embodiments. A receiver (e.g., the AP 14 or client station 25) of the data unit 200 decodes the L-SIG field 206 based on the BCC with 1/2 rate and BPSK, and the data portion 208 based on the MCS specified in L-SIG field (e.g., "legacy" decoding), in various embodiments. In an embodiment, the receiver does not utilize an explicit indication of the bandwidth of the data unit 200 to decode the data unit 200, for example, because the data unit 200 is designed for the single spatial or space-time stream and a 20 MHz communication channel.

Figure 3:
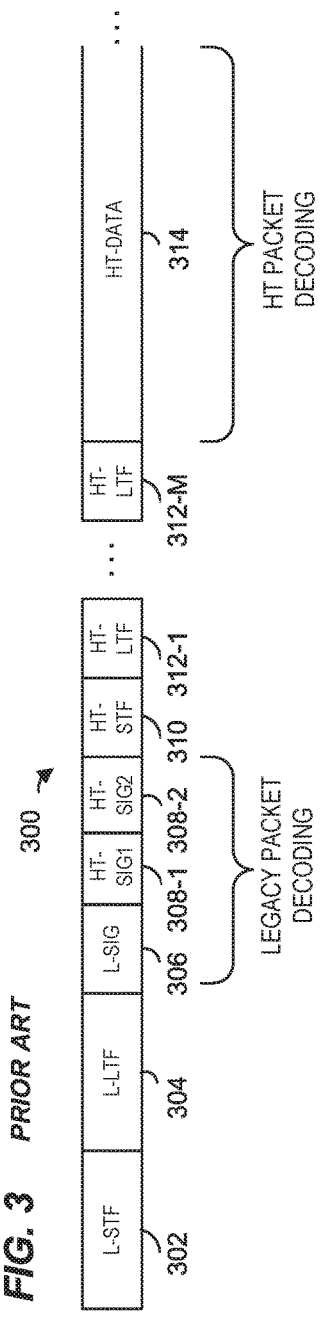
FIG. 3 is a diagram of another prior art data unit format.

FIG. 3 is a diagram of a prior art OFDM data unit 300 that the AP 14 is configured to transmit to the client station 25 via OFDM modulation, according to an embodiment. In an embodiment, the client station 25 is also configured to transmit the data unit 300 to the AP 14. The data unit 300 conforms to the IEEE 802.11n Standard, occupies a 20 MHz bandwidth, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (FIT-SIG) 308 (e.g., a non-legacy signal field), a high throughput short training field (HT-STF) 310, and M high throughput long training fields (HT-LTFs) 312, where M is an integer generally based on the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314.

A transmitter (e.g., the AP 14 or client station 25) of the data unit 300 encodes at east a first portion of the data unit 300 utilizing the first encoding scheme or legacy encoding as described above, in an embodiment. The first encoded portion includes the L-SIG field 306 and the HT-SIG field 308, in an embodiment. The transmitter encodes at least a second portion of the data unit 300 utilizing a second encoding scheme or "non-legacy encoding," for example, high throughput (HT) encoding according to the IEEE 802.11n Standard. The second encoded portion includes the data portion 314, in an embodiment. A receiver (e.g., the AP 14 or client station 25) of the data unit 300 decodes the first portion based on the first encoding scheme (e.g., legacy decoding) and decodes the second encoded portion based on the second encoding scheme (e.g., "non-legacy decoding" or HT decoding), in various embodiments. In some embodiments, the non-legacy decoding is based on sub-fields indicated in the data unit 300, for example, a signal bandwidth, modulation and coding scheme, number of spatial streams, or other suitable sub-field. In an embodiment, the signal bandwidth is indicated at bit 7 of the HT-SIG1 field 308-1.

Figure 4:
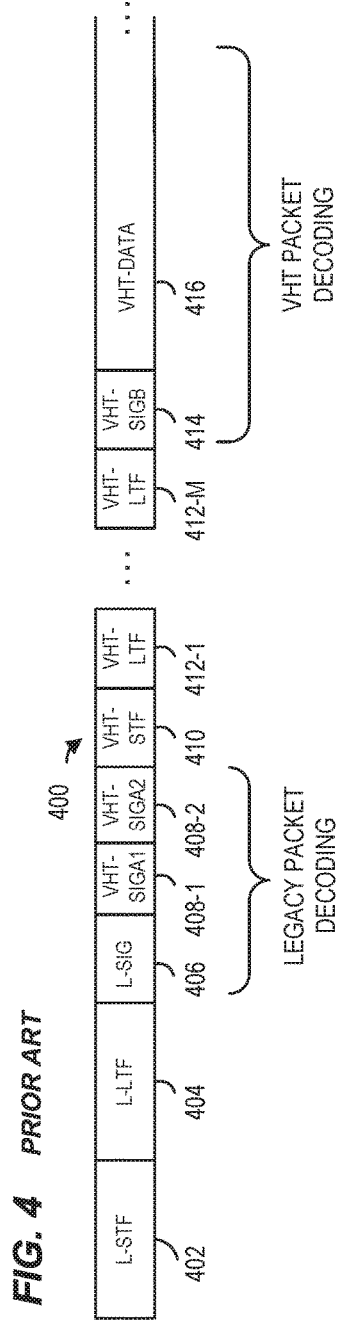
FIG. 4 is a diagram of another prior art data unit format.

FIG. 4 is a diagram of a prior art OFDM data unit 400 that the AP 14 is configured to transmit to the client station 25 via OFDM modulation, according to an embodiment. In an embodiment, the client station 25 is also configured to transmit the data unit 400 to the AP 14. The data unit 400 conforms to the IEEE 802.11ac Standard and is designed for "Mixed field" situations. The data unit 400 occupies a 20 MHz bandwidth. In other embodiments or scenarios, a data unit similar to the data unit 400 occupies a different suitable bandwidth, such as a 40 MHz, an 80 MHz, or a 160 MHz bandwidth. The data unit 400 includes a preamble having an L-STF 402, an L-LTF 404, an L-SIG 406, two first very high throughput signal fields (VHT-SIGAs) 408 including a first very high throughput signal field (VHT-SIGA1) 408-1 and a second very high throughput signal field (VHT-SIGA2) 408-2, a very high throughput short training field (VHT-STF) 410, M very high throughput long training fields (VHT-LTFs) 412, and a second very high throughput signal field (VHT-SIG-B) 414. The data unit 400 also includes a data portion 416.

A transmitter (e.g., the AP 14 or client station 25) of the data unit 400 encodes at least a first portion of the data unit 400 utilizing the first encoding scheme or legacy encoding as described above, in an embodiment. The first encoded portion includes the L-SIG field 406 and the VI-IT-SIGH field 408, in an embodiment. The transmitter encodes at least a second portion of the data unit 400 utilizing a third encoding scheme, for example, very high throughput (VHT) encoding according to the IEEE 802.11ac Standard. In some embodiments, the third encoding scheme is also referred to as a "non-legacy encoding scheme." The second encoded portion includes the VHT-SIGB field 414 and the data portion 416, in an embodiment. A receiver (e.g., the AP 14 or client station 25) of the data unit 400 decodes the first portion based on the first encoding scheme (e.g., legacy decoding) and decodes the second encoded portion based on the third encoding scheme (e.g., non-legacy decoding or WIT decoding), in various embodiments. In some embodiments, the non-legacy decoding is based on sub-fields indicated in the data unit 400, for example, a signal bandwidth, modulation and coding scheme, number of spatial streams, or other suitable sub-field. In an embodiment, the signal bandwidth is indicated at bits 0-1 of the VHT-SIGA1 field 408-1.

In various embodiments and/or scenarios, the data units 200, 300, or 400 occupy a bandwidth that is an integer multiple of 20 MHz. In other words, the data units 200, 300, or 400 are duplicated within each 20 MHz sub-channel of a WLAN communication channel. In various embodiments, for example, the transmitter duplicates the data unit 200, 300, or 400 so that a 40 MHz communication channel has two instances of the data unit, an 80 MHz communication channel has four instances of the data unit, etc.

In a conventional receiver, the first portion of the data unit 200, 300, or 400 is decoded utilizing the legacy decoding scheme on only a primary sub-channel of the WLAN communication channel even when the data unit has been duplicated across secondary sub-channels (e.g., across a bandwidth wider than 20 MHz). Generally, the conventional receiver does not have information on the bandwidth of the communication channel on which the data unit has been transmitted because such information is not explicitly included in the legacy signal field.

In various embodiments and/or scenarios, the receiver (e.g., AP 14 or client 25) decodes at least one OFDM symbol of an OFDM data unit based on a detected bandwidth, where the bandwidth is detected based on a detected candidate OFDM symbol, as described herein. In an embodiment, the receiver decodes the first portion of the data unit 200, 300, or 400 based on a detected bandwidth of the WLAN communication channel on which the data unit is duplicated. In some embodiments and/or scenarios, the receiver detects the bandwidth of the data unit earlier than a conventional receiver, for example, at the L-SIG field. In an embodiment, in response to detection of the bandwidth, the receiver combines or averages OFDM symbols from the detected bandwidth (e.g., from multiple instances across multiple sub-channels) and decodes the combined OFDM symbols. In an embodiment, the receiver performs maximum ratio combining on the OFDM symbols across the multiple 20 MHz sub-channels to obtain the combined OFDM symbol. In another embodiment, the receiver performs other equalization methods on the OFDM symbols across the multiple 20 MHz sub-channels to obtain the combined OFDM symbol. In at least some scenarios, combining the OFDM symbols across the multiple 20 MHz sub-channels improves a decoding accuracy of the OFDM symbols.

In various embodiments and/or scenarios, the receiver receives a first OFDM symbol via a first sub-channel, detects a candidate OFDM symbol in a second sub-channel, and detects the bandwidth by determining whether the candidate OFDM symbol is a duplicate of the first OFDM symbol. In an embodiment, the receiver determines whether the candidate OFDM symbol is a duplicate of the first OFDM symbol based on a comparison of respective bit sequences for the candidate OFDM symbol and the first OFDM symbol. In various embodiments, the receiver obtains a bit sequence for an OFDM symbol utilizing a sub-channel slicer (e.g., sub-channel slicer 600 described below), a decoder, or other suitable device. In an embodiment, the receiver determines whether the candidate OFDM symbol is a duplicate of the first OFDM symbol based on a difference count that indicates a number of corresponding bits of the respective bit sequences that have a different value, as described herein.

Figure 5:
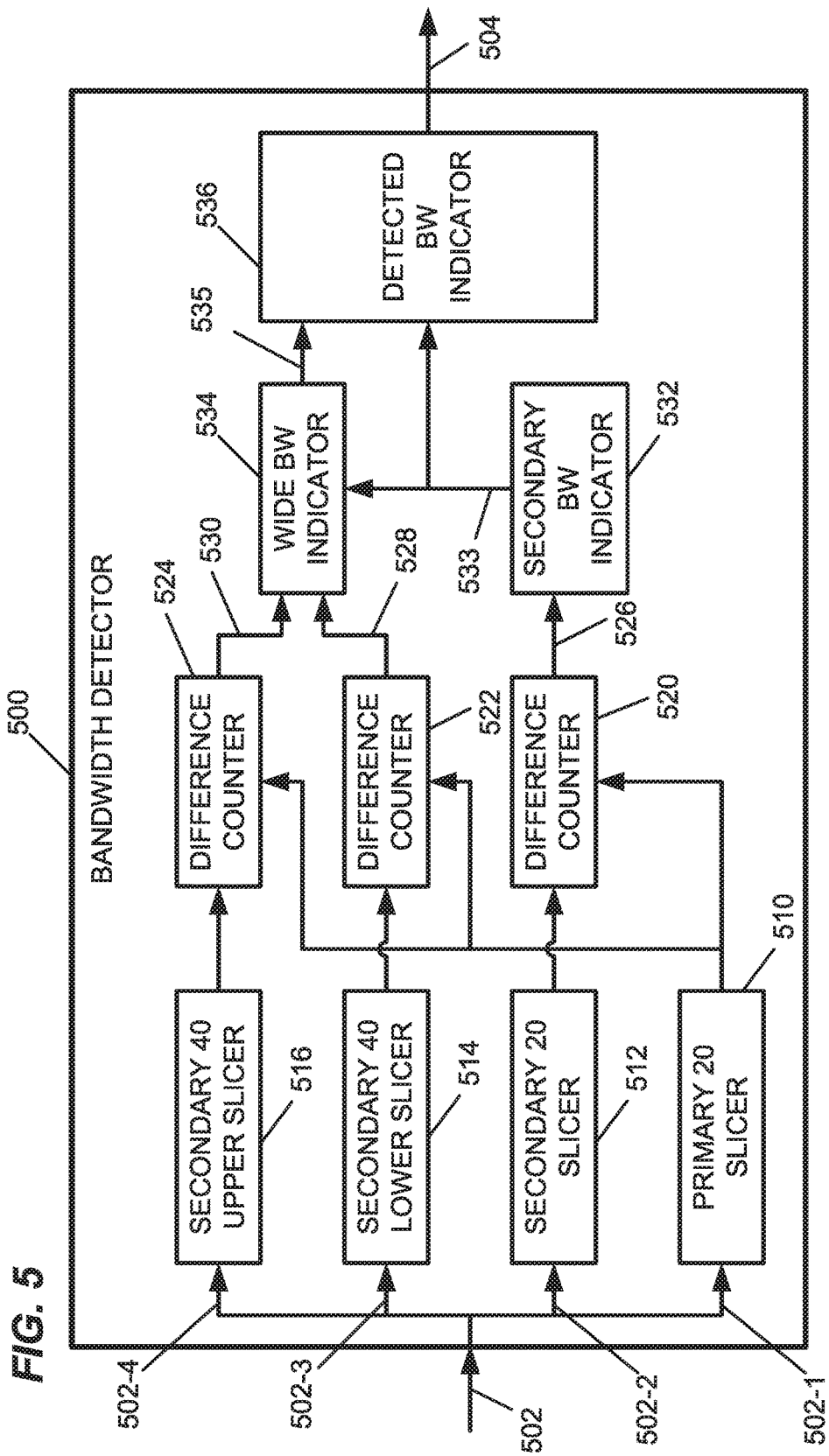
FIG. 5 is a diagram of an example bandwidth detector of a communication device, according to an embodiment.

FIG. 5 is a diagram of an example bandwidth detector 500 of a communication device, according to an embodiment. In various embodiments, the network interface 16 of the AP 14 includes the bandwidth detector 500. In an embodiment, the PHY processor 20 includes the bandwidth detector 500. In some embodiments, the network interface 27 includes the bandwidth detector 500. In an embodiment, the PHY processor 29 includes the bandwidth detector 500.

The bandwidth detector 500 receives a first OFDM symbol 502 of an OFDM data unit, detects a bandwidth of a communication channel (or sub-channels) on which the OFDM data unit has been duplicated, and outputs an indication 504 of the detected bandwidth, in various embodiments. The first OFDM symbol 502 corresponds to a timing of the L-SIG field 206, 306, or 406 received on a primary sub-channel, in various embodiments. In an embodiment, the bandwidth detector 500 operates in different frequency bands for WLAN communication channels, for example, 2.4 GHz, 5 GHz, or other suitable frequencies. In an embodiment, the first OFDM symbol 502 is provided to the bandwidth detector 500 after common phase error compensation has been performed in the frequency domain.

The bandwidth detector 500 detects the bandwidth by detecting a candidate OFDM symbol on a sub-channel different from the primary sub-channel (e.g., on a secondary sub-channel) and determining whether the candidate OFDM symbol is a duplicate of the first OFDM symbol 502, in various embodiments. The candidate OFDM symbol is referred to as a "candidate" because in some embodiments and/or scenarios, the receiver does not know whether an OFDM symbol is present or suitably decodable on the secondary sub-channel or whether the OFDM symbol, if present and suitably decodable, is a duplicate of the OFDM symbol of the primary sub-channel. In some embodiments, the bandwidth detector 500 detects a single candidate OFDM symbol on a second sub-channel, for example, a secondary 20 MHz sub-channel of a 40 MHz communication channel. In some embodiments, the bandwidth detector 500 detects a plurality of candidate OFDM symbols on a corresponding plurality of second sub-channels, for example, a secondary 20 MHz sub-channel, a first (e.g., lower) portion of a secondary 40 MHz sub-channel, and a second (e.g., upper) portion of the secondary 40 MHz sub-channel of an 80 MHz communication channel. In still other embodiments, the bandwidth detector 500 detects a plurality of candidate OFDM symbols on communication channels having a bandwidth of 160 MHz, 320 MHz, or other suitable bandwidth.

The bandwidth detector 500 determines whether the candidate OFDM symbol is a duplicate of the first OFDM symbol 502 by comparing respective bit sequences for the OFDM symbols, in various embodiments. In other embodiments, the bandwidth detector 500 determines whether the candidate OFDM symbol is a duplicate of the first OFDM symbol 502 by fully decoding the candidate OFDM symbol and comparing the decoded bit sequence, or by utilizing another suitable process. In an embodiment, the bandwidth detector 500 obtains respective bit sequences for first OFDM symbol 502 and the candidate OFDM symbol and determines a difference count that indicates a number of corresponding bits of the respective bit sequences that have a different value. In some embodiments and/or scenarios, the bandwidth detector 500 determines that the candidate OFDM symbol is a duplicate of the first OFDM symbol 502 when the difference count meets a difference threshold.

The bandwidth detector 500 includes at least one sub-channel slicer or sub-channel processor that provides a bit sequence of an OFDM symbol, in various embodiments. In other embodiments, the bandwidth detector 500 utilizes a decoder to provide the bit sequence of the OFDM symbol. The sub-channel slicer receives at least a portion of an OFDM symbol for a sub-channel and outputs the bit sequence that corresponds to the portion of the OFDM symbol, in an embodiment. As described above, the OFDM symbol corresponding to the L-SIG field 206 is encoded using BPSK, thus each of 48 data tones per 20 MHz sub-channel corresponds to one bit and the sub-channel slicer outputs a 48-bit sequence for an OFDM symbol. In some embodiments, the bandwidth detector 500 includes one sub-channel slicer for each sub-channel of a communication channel having a maximum bandwidth. In the embodiment shown in FIG. 5, for example, the bandwidth detector 500 includes four sub-channel slicers 510, 512, 514, and 516 where the sub-channel slicers are configured for 20 MHz sub-channels of a communication channel having a maximum bandwidth of 80 MHz. In the embodiment shown in FIG. 5, the sub-channel slicers 510, 512, 514, and 516 correspond to a primary 20 MHz sub-channel, a secondary 20 MHz sub-channel, a lower portion of a secondary 40 MHz sub-channel, and an upper portion of the secondary 40 MHz sub-channel. In other embodiments, two, three, four, or more of the sub-channel slicers are integrally formed, for example, as a channel processor that outputs respective bit sequences for the corresponding sub-channels.

The bandwidth detector 500 includes one or more difference counters that calculate the bit difference between bit sequences of the first sub-channel (e.g., the primary 20 MHz sub-channel) and the plurality of second sub-channels (e.g., other 20 MHz sub-channels). In the embodiment shown in FIG. 5, the bandwidth detector 500 includes difference counters 520, 522, and 524 that correspond to the second sub-channels, respectively. For each data tone (e.g., 48 data subcarriers in total), the difference counter increases the difference count by 1 if the bit sequence of the corresponding second sub-channel is different from that of the primary sub-channel, in an embodiment. In the embodiment shown in FIG. 5, the difference counter 520 provides a difference count 526 that compares the bit sequences from the sub-channel slicers 510 and 512, the difference counter 522 provides a difference count 528 that compares the bit sequences from the sub-channel slicers 510 and 514, and the difference counter 524 provides a difference count 530 that compares the bit sequences from the sub-channel slicers 510 and 516.

The difference counts have a range of [0, 48], where 0 indicates that all of the data tones for the corresponding second sub-channel and first sub-channel match each other (e.g., have a same bit value), in an embodiment. The bandwidth detector 500 determines that the candidate OFDM symbol is a duplicate of the first OFDM symbol 502 when the difference count meets a difference threshold, in various embodiments. In an embodiment, the bandwidth detector 500 includes a secondary bandwidth indicator 532 that compares the difference count 526 to the difference threshold and outputs a secondary sub-channel indication 533 that indicates whether the difference count meets the difference threshold.

In an embodiment, if the difference count is higher than the difference threshold, then the candidate OFDM symbol is determined to be not available on the corresponding second sub-channel (e.g., random noise is detected or the signal on the sub-channel is in deep fading). In some embodiments, the difference threshold is selected based on simulations or trial results and is configured to provide a low probability of false detection and good probability of detection so that a false OFDM symbol is not combined with the OFDM symbol corresponding to the L-SIG field 202, which degrades decoding performance in some scenarios. In various embodiments, the difference threshold is equal to 3, 4, 5, or another suitable integer. In an embodiment, the secondary sub-channel indication 533 has a value of 1 when the difference count meets the difference threshold (e.g., where the first OFDM symbol 502 is duplicated across at least a 40 MHz communication channel) and a value of 0 when the difference count does not meet the difference threshold.

The secondary bandwidth indicator 532 provides the secondary sub-channel indication 533 to a wide bandwidth indicator 534 and to a detected bandwidth indicator 536, various embodiments. The wide bandwidth indicator 534, described in more detail below with respect to FIG. 7, determines whether candidate OFDM symbols are duplicated over a wide bandwidth, for example, 80 MHz or more, and provides a wide bandwidth indication 535. In an embodiment, for example, the wide bandwidth indication 535 has a value of 1 when the candidate OFDM symbols are determined to be duplicated over the wide bandwidth and a value of 0 when the candidate OFDM symbols are determined to be not duplicated over the wide bandwidth.

The detected bandwidth indicator 536 determines the detected bandwidth based on the secondary sub-channel indication 533 and the wide bandwidth indication 535 and outputs the indication 504 of the detected bandwidth, in various embodiments. In an embodiment, the detected bandwidth indicator 536 determines the detected bandwidth to be i) 80 MHz if the wide bandwidth indication 535 indicates that the candidate OFDM symbols are duplicated over the wide bandwidth, ii) 40 MHz if the wide bandwidth indication 535 indicates that the candidate OFDM symbols are not duplicated and the secondary sub-channel indication 533 indicates that the candidate OFDM symbols are duplicated over the secondary sub-channel, iii) 20 MHz wide if conditions i) and ii) are not met.

In some embodiments, the detected bandwidth (or an indication thereof) is provided to a common phase error (CPE) estimation processor such that the CPE is re-estimated over the detected bandwidth. In an embodiment, for example, the CPE is determined as:

$$CPE = \frac{\sum_{i=1}^{2^{BW\_det}} \sum_{j=1}^{N_r} \sum_{k=\{-21,-7,7,21\}} h_{i,j,k}^* \cdot y_{i,j,k} \cdot P_k}{\sum_{i=1}^{2^{BW\_det}} \sum_{j=1}^{N_r} \sum_{k=\{-21,-7,7,21\}} h_{i,j,k}^* \cdot P_k} \quad \text{(Equation 1)}$$

where $h_{i,j,k}$ and $y_{i,j,k}$ are the channel estimated at L-LTF and receive signal at a sub-channel i and Rx antenna j, $P_k=\{1, 1, 1, -1\}$ for pilot subcarriers $\{-21, -7, 7, 21\}$, and BW_det is equal to 0, 1, or 2 for a detected bandwidth of 20 MHz, 40 MHz, or 80 MHz, respectively. In an embodiment, the received signal y is compensated with the new CPE for subsequent processing.

In some embodiments, the detected bandwidth is provided to a frequency equalizer (FEQ) such that the FEQ performs maximum ratio combining over the 20 MHz sub-channels for suitable duplicate OFDM symbols (e.g., the first portion that is legacy encoded, as described above). In an embodiment, maximum ratio combining is performed for each data tone k over all receive antennas for the primary 20 MHz sub-channel to obtain a combined signal $z_k$ as:

$$z_k = \frac{\sum_{i=1}^{2^{BW\_det}} \sum_{j=1}^{N_r} h_{i,j,k}^* \cdot y_{i,j,k} \cdot CPE^*}{|CPE|^2} \quad \text{(Equation 2)}$$

and a gain factor $W_k$ is determined as:

$$W_k = \sum_{i=1}^{2^{BW\_det}} \sum_{j=1}^{N_r} h_{i,j,k}^* \cdot h_{i,j,k} \quad \text{(Equation 3)}$$

Figure 6:
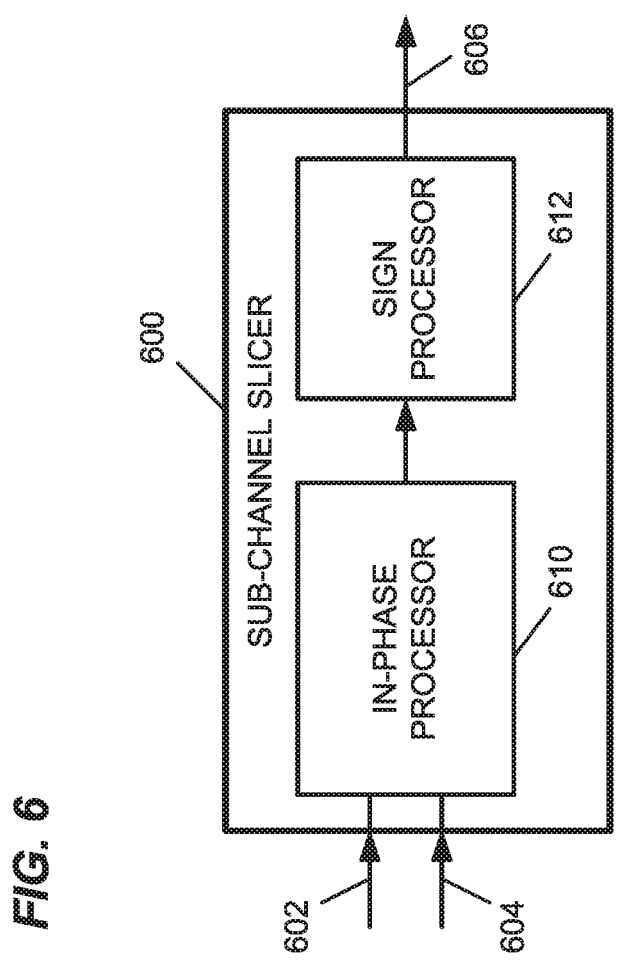
FIG. 6 is a diagram of an example sub-channel slicer of a bandwidth detector, according to an embodiment.

FIG. 6 is a diagram of an example sub-channel slicer 600 of a bandwidth detector, according to an embodiment. The sub-channel slicer 600 receives at least a portion of an OFDM symbol for a sub-channel and outputs a hit sequence that corresponds to the portion of the OFDM symbol, in an embodiment. The sub-channel slicer 600 receives a first OFDM symbol 602 and a channel estimate 604 and provides a bit sequence 606 for the first OFDM symbol 602, in various embodiments. In an embodiment, the sub-channel slicer 600 corresponds to one or more of the sub-channel slicers 510, 512, 514, or 516 and provides the bit sequence 606 to the corresponding difference counter 520, 522, or 524. The first OFDM symbol 602 corresponds to an field after common phase error compensation has been performed in the frequency domain (e.g., by the PHY processor 20 or 29), in various embodiments. In an embodiment, for example, the first OFDM symbol 602 is a portion of the first OFDM symbol 502 for the corresponding sub-channel processed by the sub-channel slicer 600. The channel estimate 604 is a channel estimate of the corresponding sub-channel and is based on an L-LTF field that precedes the L-SIG field, in an embodiment.

The sub-channel slicer 600 includes an in-phase processor 610 and a sign processor 612, in an embodiment. The in-phase processor 610 determines an in-phase estimate $\hat{I}$ as:

$$\hat{I} = \sum_{i=1}^{N_r} I_{CPE\_out,i} \cdot I_{CE-LLTF,i} + Q_{CPE\_out,i} \cdot Q_{CE-LLTF,i} \quad \text{(Equation 4)}$$

where $N_r$ is a number of antennas (e.g., antenna 24 or 34), I is an in-phase portion, Q is a quadrature portion, $CPE_{out}$ is the first OFDM symbol 602, and CE-LLTF is the channel estimate 604. The in-phase processor 610 calculates the in-phase estimate $\hat{I}$ on each of the data tones of the first OFDM symbol 602 and the sign processor 612 obtains the sign (e.g., +1 or -1) of the in-phase estimate $\hat{I}$ as a bit of the bit sequence 606, in an embodiment.

Figure 7:
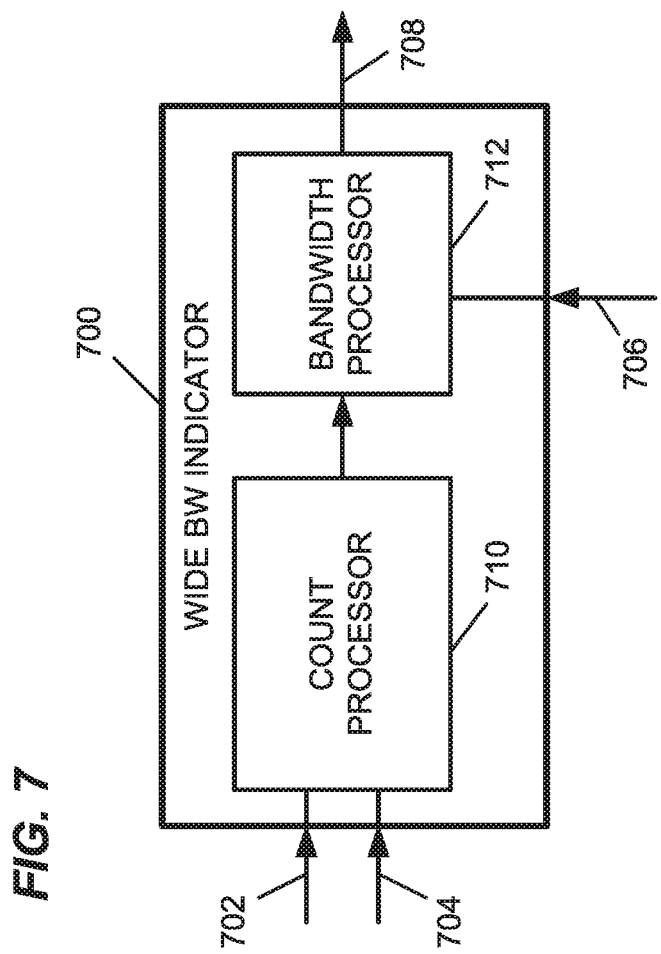
FIG. 7 is a diagram of an example wide bandwidth indicator of a bandwidth detector, according to an embodiment.

FIG. 7 is a diagram of an example wide bandwidth indicator 700 of a bandwidth detector, according to an embodiment. The wide bandwidth indicator 700 receives a first count 702, a second count 704, and a secondary sub-channel indication 706 and determines whether candidate OFDM symbols are duplicated over a wide bandwidth, for example, 80 MHz or another suitable bandwidth, in various embodiments. The wide bandwidth indicator 700 provides a wide bandwidth indication 708 if the candidate OFDM symbols are determined to be duplicated over the wide bandwidth. In an embodiment, the wide bandwidth indication 708 corresponds to the wide bandwidth indication 535.

In an embodiment, the first count 702 and the second count 704 correspond to a difference count of a lower portion of a secondary 40 MHz sub-channel and a difference count of an upper portion of the secondary 40 MHz sub-channel, respectively. Thus, the first count 702 and the second count 704 indicate whether the first OFDM symbol is duplicated across an upper 40 MHz sub-channel of an 80 MHz wide bandwidth communication channel, and the secondary sub-channel indication 706 indicates whether the first OFDM symbol is duplicated across a lower 40 MHz sub-channel of the 80 MHz wide communication channel. In an embodiment, the wide bandwidth indicator 700 corresponds to the wide bandwidth indicator 534 and receives the difference counts 528 and 530 as the first and second counts and receives the secondary sub-channel indication 533 as the secondary sub-channel indication 706.

The wide bandwidth indicator 700 includes a count processor 710 and a bandwidth processor 712, in an embodiment. The count processor 710 adds the first count 702 and the second count 704 to determine an overall count for the upper 40 MHz sub-channel of the 80 MHz communication channel and provides the overall count to the bandwidth processor 712. In other words, the overall count is an integer number of data tones for the 48+48 data tones of the upper 40 MHz sub-channel that do not match the first OFDM data unit.

The bandwidth processor 712 determines the detected bandwidth based on the overall count for the upper 40 MHz sub-channel and the secondary sub-channel indication 706 for the lower 40 MHz sub-channel and provides the 708. In an embodiment, for example, the bandwidth processor 712 sets the wide bandwidth indication 708 to a value of 1 when both i) the overall count meets a first wide threshold, and ii) the secondary sub-channel indication 706 (i.e., the secondary sub-channel indication 533) indicates that the difference count meets the difference threshold. In an embodiment, the wide bandwidth indication 708 has a value of 0 when either the overall count does not meet the first wide threshold or the difference count does not meet the difference threshold. In various embodiments, the first wide threshold for the upper 40 MHz sub-channel is based on the difference threshold for the secondary 20 MHz. In an embodiment, for example, the first wide threshold is a multiple (e.g., 2×, 2.5×, or other suitable value) of the difference threshold.

In some scenarios, a first OFDM symbol that is duplicated across an 80 MHz communication channel is subject to severe fading in the secondary 20 MHz sub-channel such that the difference count does not meet the difference threshold while the overall count for the secondary 40 MHz sub-channel meets the first wide threshold. In an embodiment, for example, the bandwidth processor 712 sets the wide bandwidth indication 708 to a value of 1 when the difference count does not meet the difference threshold and the overall count meets a second wide threshold, where the second wide threshold is more strict (e.g., less than) the first wide threshold.

Figure 8:
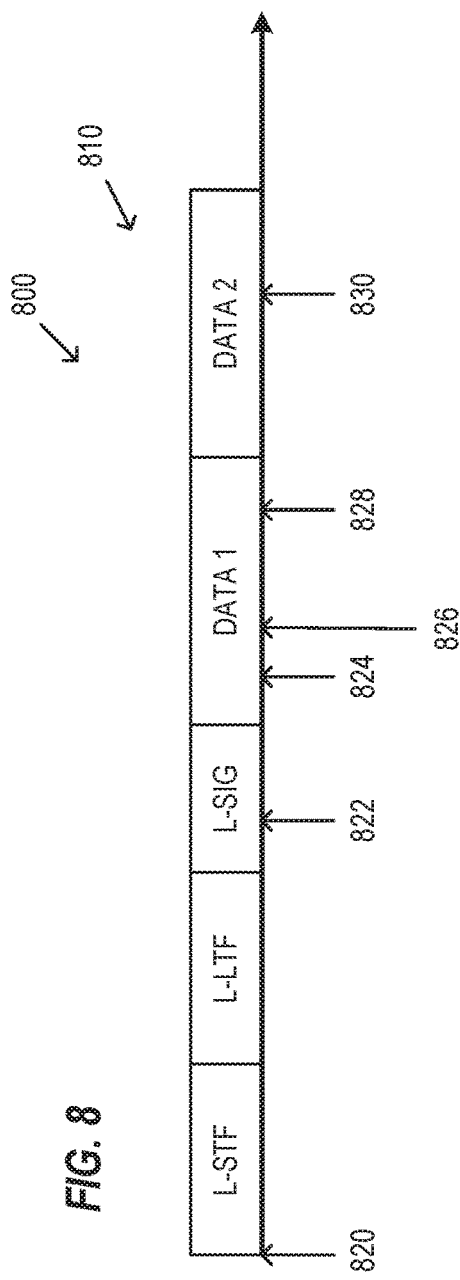
FIG. 8 is a diagram of an example timeline for decoding an orthogonal frequency division multiplex (OFDM) data unit, according to an embodiment.

FIG. 8 is a diagram of an example timeline 800 for decoding an OFDM data unit 810, according to an embodiment. As shown in FIG. 8, the timeline 800 for decoding the OFDM data unit 810 begins at a time 820 and proceeds, left to right, until an end of a data portion ("Data 2") of the OFDM data unit 810. The description below refers to a receiver of the OFDM data unit 810, which is the AP 14 or client station 25, in various embodiments and/or scenarios. In an embodiment, the OFDM data unit 810 corresponds to the OFDM data unit 200, as described above with respect to FIG. 2.

At a time 820, the receiver begins receiving OFDM symbols that correspond to the L-STF field 202, followed by the L-LTF field 204, in an embodiment. The receiver determines a channel estimate for a full bandwidth of the communication channel based on the L-LTF field 204, in an embodiment.

At a time 822, the receiver completes a full bandwidth channel estimate based on the L-LTF field 204, in an embodiment. In other words, the receiver has a channel estimate for a 40 MHz, 80 MHz, 160 MHz, or other suitable bandwidth communication channel. In an embodiment, the full bandwidth channel estimate corresponds to the channel estimate 604.

At a time 824, the receiver i) completes a Fast Fourier Transform (FFT) and common phase error estimation for the OFDM symbols corresponding to the L-SIG field 206, and ii) starts bandwidth detection, in an embodiment. In an embodiment, for example, the receiver provides the OFDM symbols for the L-SIG field 206 to the bandwidth detector 500.

At a time 826, the receiver i) completes the detection of the bandwidth, and ii) starts to perform maximum ratio combining over the detected bandwidth for the L-SIG field 206 and decodes the combined symbols, in an embodiment.

At a time 828, the receiver completes the maximum ratio combining and decoding of the L-SIG field 206, in an embodiment.

At a time 830, the receiver completes the maximum ratio combining and decoding of the data portion Data 1, in an embodiment.

Figure 9:
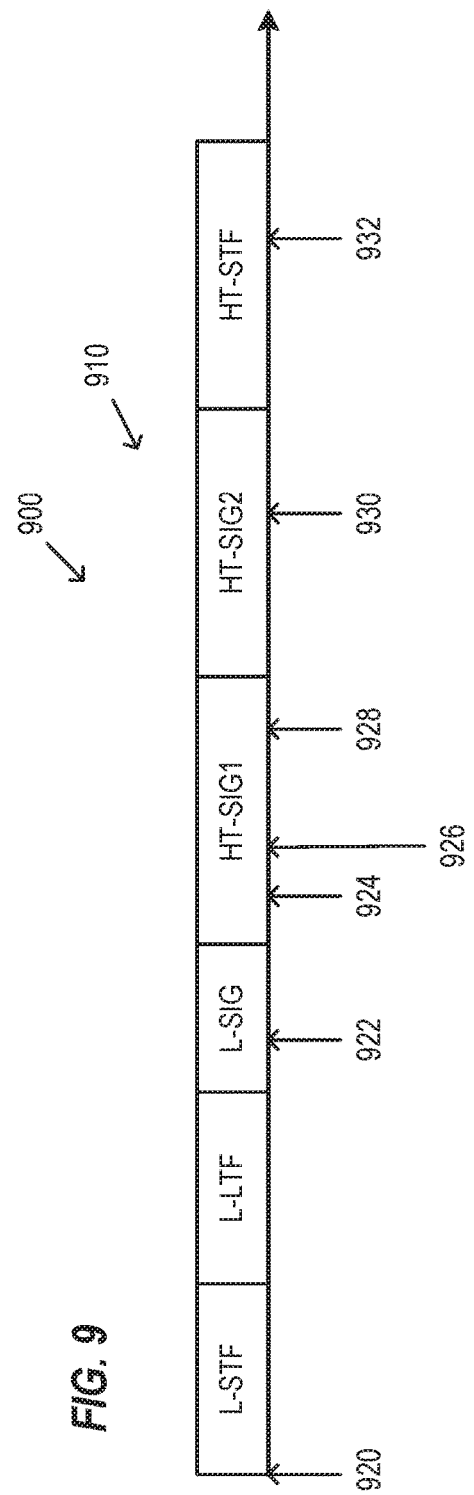
FIG. 9 is a diagram of another example timeline for decoding an OFDM data unit, according to an embodiment.

FIG. 9 is a diagram of another example timeline 900 for decoding an OFDM data unit 910, according to an embodiment. As shown in FIG. 9, the timeline 900 for decoding the OFDM data unit 910 begins at a time 920 and proceeds, left to right, until an end of an HT-STF field of the OFDM data unit 910. The description below refers to a receiver of the OFDM data unit 810, which is the AP 14 or client station 25, in various embodiments and/or scenarios. In an embodiment and as described below, the OFDM data unit 910 corresponds to the OFDM data unit 300, as described above with respect to FIG. 3. In another embodiment, the OFDM data unit 910 corresponds to the OFDM data unit 400, as described above with respect to FIG. 4.

At a time 920, the receiver begins receiving OFDM symbols that correspond to the L-STF field 302, followed by the L-LTF field 304, in an embodiment. The receiver determines a channel estimate for a full bandwidth of the communication channel based on the L-LTF field 304, in an embodiment.

At a time 922, the receiver completes a full bandwidth channel estimate based on the L-LTF field 304, in an embodiment. In other words, the receiver has a channel estimate for a 40 MHz, 80 MHz, 160 MHz, or other suitable bandwidth communication channel. In an embodiment, the full bandwidth channel estimate corresponds to the channel estimate 604.

At a time 924, the receiver i) completes a Fast Fourier Transform (FFT) and common phase error estimation for the OFDM symbols corresponding to the L-SIG field 306, and ii) starts bandwidth detection, in an embodiment. In an embodiment, for example, the receiver provides the OFDM symbols for the L-SIG field 306 to the bandwidth detector 500.

At a time 926, the receiver i) completes the detection of the bandwidth, and ii) starts to perform maximum ratio combining over the detected bandwidth for the L-SIG field 306 and decodes the combined symbols, in an embodiment.

At a time 928, the receiver completes the maximum ratio combining and decoding of the L-SIG field 306, in an embodiment.

At a time 930, the receiver completes the maximum ratio combining and decoding of the HT-SIG1 field, in an embodiment.

At a time 932, the receiver completes the maximum ratio combining and decoding of the HT-SIG2 field, in an embodiment. In some embodiments, after decoding the HT-SIG1 and/or HT-SIG2 fields, the receiver utilizes a bandwidth that is explicitly indicated in the HT-SIG1 and/or HT-SIG2 fields instead of the detected bandwidth.

Figure 10:
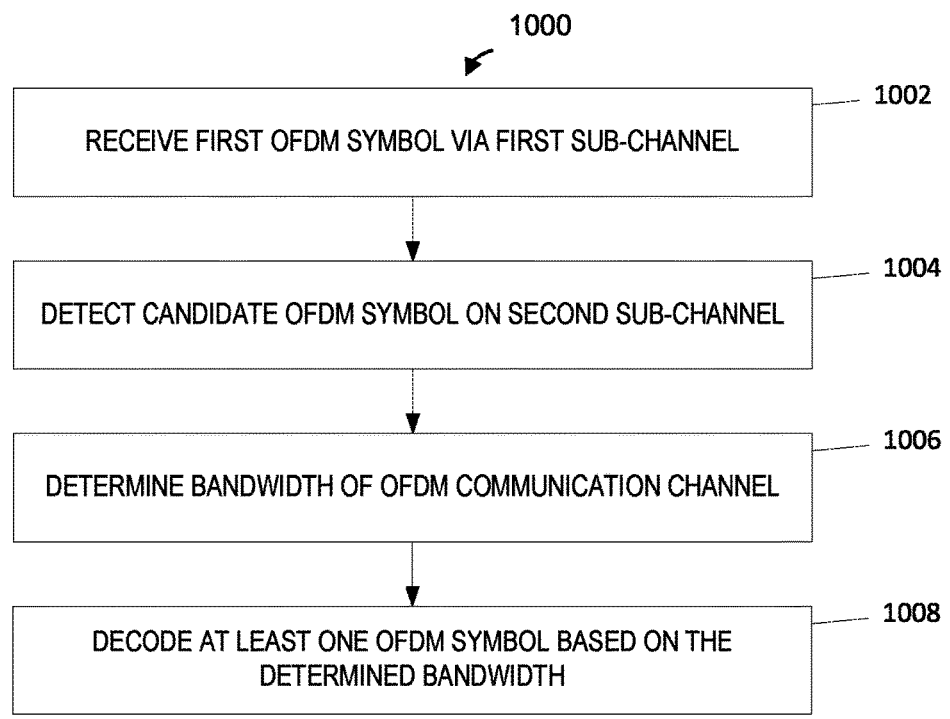
FIG. 10 is a diagram illustrating an example method for decoding an OFDM data unit, according to an embodiment.

FIG. 10 is a flow diagram illustrating an example method 1000 for decoding an OFDM data unit transmitted via an OFDM communication channel, according to an embodiment. In an embodiment, the method 1000 is implemented by a client station in the WLAN, according to an embodiment. With reference to FIG. 1, the method 1000 is implemented by the network interface 27, in an embodiment. For example, in one such embodiment, the PHY processor 29 is configured to implement the method 1000. According to another embodiment, the MAC processing 28 is also configured to implement at least a part of the method 1000. With continued reference to FIG. 1, in yet another embodiment, the method 1000 is implemented by the AP 14, for example, the network interface 16 (e.g., the PHY processor 20 and/or the MAC processor 18). In other embodiments, the method 1000 is implemented by other suitable network interfaces.

At block 1002, a first OFDM symbol of the OFDM data unit is received via a first sub-channel of the OFDM communication channel, in an embodiment.

At block 1004, a candidate OFDM symbol is detected on a second sub-channel of the OFDM communication channel, in an embodiment. In some embodiments, a plurality of candidate OFDM symbols are detected on a respective plurality of sub-channels of the OFDM communication channel where the plurality of candidate OFDM symbols includes the candidate OFDM symbol. In an embodiment, the first OFDM symbol and the candidate OFDM symbol are simultaneously received via the first sub-channel and the second sub-channel, respectively.

At block 1006, a bandwidth of the OFDM communication channel is detected based on the detected candidate OFDM symbol, in an embodiment. In some embodiments, detecting the bandwidth includes determining whether the candidate OFDM symbol is a duplicate of the first OFDM symbol. In an embodiment, respective bit sequences for the first OFDM symbol and the candidate OFDM symbol are obtained. A difference count that indicates a number of corresponding bits of the respective bit sequences that have a different value is determined. The candidate OFDM symbol is determined to be a duplicate of the first OFDM symbol when the difference count meets a difference threshold.

At block 1008, at least one OFDM symbol of the OFDM data unit is decoded based on the detected bandwidth, in an embodiment. In an embodiment, in response to a determination that the candidate OFDM symbol is a duplicate of the first OFDM symbol, each of the at least one OFDM symbol of the OFDM data unit is combined with a respective OFDM symbol simultaneously received via the second sub-channel. The combined OFDM symbol is then decoded. In an embodiment, maximum ratio combining is performed on the each of the at least one OFDM symbol of the OFDM data unit and the respective OFDM symbol simultaneously received via the second sub-channel. In an embodiment, the at least one OFDM symbol includes the first OFDM symbol and at least one second OFDM symbol of the OFDM data unit.

In an embodiment, the OFDM data unit corresponds to the IEEE 802.11a Standard or IEEE 802.11g Standard, the first OFDM symbol corresponds to a legacy signal field of the OFDM data unit, and the at least one OFDM symbol includes OFDM symbols that correspond to the legacy signal field and a data field of the OFDM data unit. In another embodiment, the OFDM data unit corresponds to the IEEE 802.11m Standard or the IEEE 802.11ac Standard, the first OFDM symbol corresponds to a legacy signal field of the OFDM data unit, and the at least one OFDM symbol includes OFDM symbols that correspond to the legacy signal field and a non-legacy signal field of the OFDM data unit.

In an embodiment, common phase error compensation is performed for the at least one OFDM symbol utilizing pilot tones within the detected bandwidth.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for decoding an orthogonal frequency division multiplex (OFDM) data unit transmitted via an OFDM communication channel, the method comprising:
   receiving, at a communication device, a first OFDM symbol of the OFDM data unit via a first sub-channel of the OFDM communication channel;
   detecting, by the communication device, a candidate OFDM symbol on a second sub-channel of the OFDM communication channel;
   detecting, by the communication device, a bandwidth of the OFDM communication channel based on the detected candidate OFDM symbol, including i) determining whether the candidate OFDM symbol is a duplicate of the first OFDM symbol, and ii) determining that the OFDM communication channel includes the second sub-channel when the candidate OFDM symbol is determined to be the duplicate of the first OFDM symbol; and
   decoding, by the communication device, at least one OFDM symbol of the OFDM data unit based on the detected bandwidth.

2. The method of claim 1, wherein determining whether the candidate OFDM symbol is a duplicate of the first OFDM symbol comprises:
   obtaining respective bit sequences for the first OFDM symbol and the candidate OFDM symbol;
   determining a difference count that indicates a number of corresponding bits of the respective bit sequences that have a different value; and
   determining that the candidate OFDM symbol is a duplicate of the first OFDM symbol when the difference count meets a difference threshold.

3. The method of claim 1, wherein decoding the at least one OFDM symbol comprises:
   in response to a determination that the candidate OFDM symbol is a duplicate of the first OFDM symbol, combining each of the at least one OFDM symbol of the OFDM data unit with a respective OFDM symbol simultaneously received via the second sub-channel; and
   decoding the combined OFDM symbol.

4. The method of claim 3, wherein combining each of the at least one OFDM symbol comprises performing maximum ratio combining on the each of the at least one OFDM symbol of the OFDM data unit and the respective OFDM symbol simultaneously received via the second sub-channel.

5. The method of claim 3, wherein the at least one OFDM symbol includes the first OFDM symbol and at least one second OFDM symbol of the OFDM data unit.

6. The method of claim 1, wherein:
detecting the candidate OFDM symbol comprises detecting a plurality of candidate OFDM symbols on a respective plurality of sub-channels of the OFDM communication channel; and
the plurality of candidate OFDM symbols includes the candidate OFDM symbol.

7. The method of claim 1, wherein the method further comprises simultaneously receiving at the communication device i) the first OFDM symbol via the first sub-channel, and ii) the candidate OFDM symbol via the second sub-channel.

8. The method of claim 1, wherein:
the OFDM data unit corresponds to the IEEE 802.11a Standard or IEEE 802.11g Standard;
the first OFDM symbol corresponds to a legacy signal field of the OFDM data unit; and
the at least one OFDM symbol includes OFDM symbols that correspond to the legacy signal field and a data field of the OFDM data unit.

9. The method of claim 1, wherein:
the OFDM data unit corresponds to the IEEE 802.11n Standard or the IEEE 802.11ac Standard;
the first OFDM symbol corresponds to a legacy signal field of the OFDM data unit; and
the at least one OFDM symbol includes OFDM symbols that correspond to the legacy signal field and a non-legacy signal field of the OFDM data unit.

10. The method of claim 1, wherein the method further comprises:
performing, by the communication device, common phase error compensation for the at least one OFDM symbol utilizing pilot tones within the detected bandwidth.

11. A communication device for decoding an orthogonal frequency division multiplex (OFDM) data unit transmitted via an OFDM communication channel, the communication device comprising:
a network interface device having one or more integrated circuits configured to
receive a first OFDM symbol of the OFDM data unit via a first sub-channel of the OFDM communication channel,
detect a candidate OFDM symbol on a second sub-channel of the OFDM communication channel,
detect a bandwidth of the OFDM communication channel based on the detected candidate OFDM symbol, including i) determining whether the candidate OFDM symbol is a duplicate of the first OFDM symbol, and ii) determining that the OFDM communication channel includes the second sub-channel when the candidate OFDM symbol is determined to be the duplicate of the first OFDM symbol, and
decode at least one OFDM symbol of the OFDM data unit based on the detected bandwidth.

12. The communication device of claim 11, wherein the one or more integrated circuits are configured to:
obtain respective bit sequences for first OFDM symbol and the candidate OFDM symbol;
determine a difference count that indicates a number of corresponding bits of the respective bit sequences that have a different value; and
determine that the candidate OFDM symbol is a duplicate of the first OFDM symbol when the difference count meets a difference threshold.

13. The communication device of claim 11, wherein the one or more integrated circuits are configured to:
in response to a determination that the candidate OFDM symbol is a duplicate of the first OFDM symbol, combine each of the at least one OFDM symbol of the OFDM data unit with a respective OFDM symbol simultaneously received via the second sub-channel; and
decode the combined OFDM symbol.

14. The communication device of claim 13, wherein the one or more integrated circuits are configured to perform maximum ration combining on the each of the at least one OFDM symbol of the OFDM data unit and the respective OFDM symbol simultaneously received via the second sub-channel.

15. The communication device of claim 11, wherein:
the one or more integrated circuits are configured to detect a plurality of candidate OFDM symbols on a respective plurality of sub-channels of the OFDM communication channel; and
the plurality of candidate OFDM symbols includes the candidate OFDM symbol.

16. The communication device of claim 11, wherein the one or more integrated circuits are configured to simultaneously receive i) the first OFDM symbol via the first sub-channel, and ii) the candidate OFDM symbol via the second sub-channel.

17. The communication device of claim 11, wherein:
the OFDM data unit corresponds to the IEEE 802.11a Standard or IEEE 802.11g Standard;
the first OFDM symbol corresponds to a legacy signal field of the OFDM data unit; and
the at least one OFDM symbol includes OFDM symbols that correspond to the legacy signal field and a data field of the OFDM data unit.

18. The communication device of claim 11, wherein:
the OFDM data unit corresponds to the IEEE 802.11n Standard or the IEEE 802.11ac Standard;
the first OFDM symbol corresponds to a legacy signal field of the OFDM data unit; and
the at least one OFDM symbol includes OFDM symbols that correspond to the legacy signal field and a non-legacy signal field of the OFDM data unit.

19. A method for decoding an orthogonal frequency division multiplex (OFDM) data unit via an OFDM communication channel, the method comprising:
receiving, at a communication device, a first OFDM symbol of the OFDM data unit via a first sub-channel of the OFDM communication channel;
detecting, by the communication device, a candidate OFDM symbol on a second sub-channel of the OFDM communication channel;
detecting, by the communication device, a bandwidth of the OFDM communication channel based on the detected candidate OFDM symbol, including determining whether the candidate OFDM symbol is a duplicate of the first OFDM symbol based on respective bit sequences for the first OFDM symbol and the candidate OFDM symbol; and decoding, by the communication device, at least one OFDM symbol of the OFDM data unit based on the detected bandwidth.

* * * * *